US012797843B2

(12) United States Patent
Landegren et al.

(10) Patent No.: US 12,797,843 B2
(45) Date of Patent: Nov. 17, 2026

(54) SAMPLING DEVICE

(71) Applicant: SampleFacts AB, Uppsala (SE)

(72) Inventors: Ulf Landegren, Uppsala (SE); Johan Björkesten, Storvreta (SE)

(73) Assignee: SampleFacts AB, Uppsala (SE)

( * ) Notice: Subject to any disclaimer, the term of this patent is extended or adjusted under 35 U.S.C. 154(b) by 863 days.

(21) Appl. No.: 18/020,585

(22) PCT Filed: Aug. 10, 2021

(86) PCT No.: PCT/EP2021/072308

§ 371 (c)(1),
(2) Date: Feb. 9, 2023

(87) PCT Pub. No.: WO2022/034106

PCT Pub. Date: Feb. 17, 2022

(65) Prior Publication Data

US 2023/0264190 A1 Aug. 24, 2023

(30) Foreign Application Priority Data

Aug. 10, 2020 (GB) ...................................... 2012419

(51) Int. Cl.
*B01L 3/00* (2006.01)

(52) U.S. Cl.
CPC ........... *B01L 3/5023* (2013.01); *B01L 3/5055* (2013.01); *B01L 2300/043* (2013.01);
(Continued)

(58) Field of Classification Search
CPC ................. B01L 3/5023; B01L 3/5055; B01L 2300/043; B01L 2300/0681;
(Continued)

(56) References Cited

U.S. PATENT DOCUMENTS

| | | | |
|---|---|---|---|
| 5,186,843 | A | 2/1993 | Baumgardner et al. |
| 10,663,379 | B2 | 5/2020 | Dick et al. |

(Continued)

FOREIGN PATENT DOCUMENTS

| | | | |
|---|---|---|---|
| CN | 107349983 | A | 11/2017 |
| DE | 10301176 | A1 | 7/2004 |

(Continued)

OTHER PUBLICATIONS

Examination Report, Indian Application No. 202327014239, dated Mar. 5, 2026.

(Continued)

*Primary Examiner* — Charles Capozzi
*Assistant Examiner* — Jacqueline Brazin
(74) *Attorney, Agent, or Firm* — MARSHALL, GERSTEIN & BORUN LLP

(57) ABSTRACT

A device for use in the separation of biological samples into a solid component and a liquid component. The device comprises a front cover and a back cover connected at a hinge portion such that the device is operable between an open position and a closed position. A separation membrane is arranged to retain the solid component and to allow the liquid component to pass therethrough, and an absorption membrane is arranged to retain the liquid component. The separation and absorption membranes are arranged in a layered structure between the front and back covers. Opening the device from the closed position to the open position causes the separation and absorption membranes to bend, thereby applying a compressive force to the membranes.

24 Claims, 8 Drawing Sheets

(52) U.S. Cl.
CPC . *B01L 2300/0681* (2013.01); *B01L 2300/069* (2013.01); *B01L 2300/126* (2013.01); *B01L 2400/0406* (2013.01)

(58) Field of Classification Search
CPC ......... B01L 2300/069; B01L 2300/126; B01L 2400/0406; B01L 3/502707; B01L 2300/0887; B01L 2300/123; B01L 3/54; B01L 2300/0809; B01L 2300/14; B01L 2400/0481; B01D 33/29; B01D 2221/10
USPC ........................................................ 435/283.1
See application file for complete search history.

(56) References Cited

U.S. PATENT DOCUMENTS

| | | | |
|---|---|---|---|
| 2005/0196318 | A1 | 9/2005 | Matusewicz et al. |
| 2008/0135502 | A1 | 6/2008 | Pyo et al. |
| 2009/0120865 | A1 | 5/2009 | Chung et al. |
| 2010/0185230 | A1 | 7/2010 | Horan et al. |
| 2010/0233708 | A1* | 9/2010 | Mehra .............. G01N 33/54389 435/7.1 |
| 2011/0182785 | A1 | 7/2011 | Chan |
| 2012/0088227 | A1 | 4/2012 | Gruebl et al. |
| 2012/0329148 | A1 | 12/2012 | Hur et al. |
| 2016/0089669 | A1 | 3/2016 | Regnier et al. |
| 2016/0290901 | A1 | 10/2016 | Dick et al. |
| 2019/0100049 | A1 | 4/2019 | Herrmann |
| 2019/0369071 | A1* | 12/2019 | Venumadhav ........ B01L 3/5023 |
| 2023/0176047 | A1* | 6/2023 | Yoshimura ........ B01L 3/502746 422/82.06 |

FOREIGN PATENT DOCUMENTS

| | | | |
|---|---|---|---|
| EP | 0194502 | A2 | 9/1986 |
| EP | 0457183 | A1 | 11/1991 |
| EP | 1746419 | A1 | 1/2007 |
| EP | 2020598 | A1 | 2/2009 |
| EP | 2375249 | A2 | 10/2011 |
| GB | 2570679 | A | 8/2019 |
| JP | 2008275627 | A | 11/2008 |
| KR | 20160053741 | A | 5/2016 |
| WO | WO-2009106331 | A2 | 9/2009 |
| WO | WO-2011051405 | A1 | 5/2011 |
| WO | WO-2012015926 | A2 | 2/2012 |
| WO | WO-2014024157 | A1 | 2/2014 |
| WO | WO-2015/013486 | A1 | 1/2015 |
| WO | WO-2015071515 | A1 | 5/2015 |
| WO | WO-2015095853 | A1 | 6/2015 |
| WO | WO-2016/025726 | A1 | 2/2016 |
| WO | WO-2016073415 | A2 | 5/2016 |
| WO | WO-2016073823 | A1 | 5/2016 |
| WO | WO-2016093999 | A1 | 6/2016 |
| WO | WO-2016172675 | A1 | 10/2016 |
| WO | WO-2017120317 | A1 | 7/2017 |
| WO | WO-2018193159 | A1 | 10/2018 |
| WO | WO-2018202622 | A1 | 11/2018 |
| WO | WO-2020142840 | A1 | 7/2020 |
| WO | WO-2020/157388 | A1 | 8/2020 |

OTHER PUBLICATIONS

Combined Search and Examination Report, United Kingdom Application No. 2012419.4, dated Feb. 4, 2021.
International Search Report and Written Opinion, International Application No. PCT/EP2021/072308, dated Nov. 15, 2021.

* cited by examiner

SAMPLING DEVICE

TECHNICAL FIELD

The present invention relates to a device used for separating a biological sample into cellular and liquid components, e.g. for medical diagnosis, clinical analysis and/or biobanking. Particularly, though not exclusively, the device may be used for separating blood into blood cells and blood plasma.

BACKGROUND TO THE INVENTION

It is important to find new and improved means to collect biological samples such as blood, e.g. for intermediate testing or for biobanking, in order to monitor an individual's health and/or disease. A biobank is a form of depository for biological samples for use in medical research, diagnosis and clinical analysis. In general, large prospective biobanks of samples will have to be collected before the clinical onset of disease, in order to use the samples to identify and validate prognostic biomarkers for early detection of disease. Additionally, targeted therapies that only work in a subset of patients require frequent testing in order to monitor therapeutic responses, both in drug development and in clinical practice, requiring extensive and continuous sample collection.

In recent years, there has been an increased interest in 'wellness', where individuals may wish to monitor their general wellbeing with a view to living a healthy lifestyle. Even those free of any particular condition may wish to monitor their general health so as to determine, for example, if they should change some aspect of their lifestyle. Monitoring wellness over a period of time may allow for early detection of changes in the individual's health. Samples of biological material may be taken from the individual over a period of time to detect such changes.

Recent improvements in sample testing have reduced the amount (i.e. the physical volume) of sample required, thereby permitting less invasive sampling procedures, e.g. finger pricks. Assays for analysing samples have also become more comprehensive, resulting in reduced costs and greatly expanding the readiness and scale of biobanked material. Furthermore, rapidly growing insights in molecular markers of medical relevance has greatly increased the medical value of such analyses, stimulating a further need for efficient means to collect, transport and store biological samples.

Generally, it may be desirable to provide a means of separating the solid, e.g. cellular, components of the biological sample from the liquid components. The upfront separation of the solid and liquid components of the biological sample reduces the complexity of both sample modalities thereby aiding downstream analysis. For example, if the biological sample is blood, it may be desirable to separate the cellular components of blood and blood plasma. This enables the cellular component and plasma component to be separately analysed, as is done in routine healthcare tests. For example, the diagnostically-important composition of blood cells could be investigated by measuring levels of characteristic transcripts or proteins in the cell fraction, while protein levels could be measured in the plasma fractions. The different classes of blood cells serve as well-established biomarkers in a wide-range of conditions, for example AIDS, anaemia, bacterial vs. viral infection, allergy, etc.

The Applicant has appreciated that a further motivation for separating blood cells and plasma is that certain types of assays for plasma proteins may involve the addition of reagents that give rise to coloured or fluorescent products in proportion to the target molecules present in the sample. Such assays may generally be prevented by red blood cells but could work well in plasma. Thus being able to separate the plasma from the blood cells may advantageously allow such assays to be carried out.

When separating and collecting biological samples, it is also necessary to provide a means of capturing the biological sample of interest. One approach known in the art per se, e.g. in relation to blood samples, is to collect and maintain the samples by drying them on specialised membrane surfaces. This can serve to stabilise samples by reducing enzyme activity in the dried state, either for short- or long-term storage, thereby simplifying standardisation of sampling. The act of drying may also serve to remove well-known variables that lead to inconsistent processing of blood samples such as haemolysis, and other forms of cell death, whereby cell lysis can result in the release of the cellular contents into the plasma fraction of the blood.

Other well-known variables linked to inconsistent processing of samples may include degradation of nucleic acid components of the sample or post-translational modification of protein components; these variables may also be removed as a result of sample drying.

Popular methods of separation, known in the art per se, include filtration or centrifugation. However, these methods of separation each have problems associated with them. For example, filtration of the sample through a membrane requires a driving force, such as capillary suction or gravity, to achieve flow of the sample through the filtering material. Efficient filtration through a membrane is difficult to achieve, especially in portable separation devices. Common solutions include stacking a filtration membrane on top one or more layers where the layers below the filtration membrane serve to pull the fluid sample through by capillary suction. However, generating the required pressure on the membranes to achieve efficient sample filtering and collection is difficult to achieve and there is a lack of effective means to overcome this issue in the prior art.

The Applicant has appreciated that it would be desirable to have a mechanism by which biological samples are collected using a simple, portable device that permits individual sampling, potentially without the help of a health professional. It is therefore an aim of the present invention to provide a cheap, portable device that can provide effective separation and drying of cells and liquids in biological samples supplied in relatively small amounts, while being suitable for efficient transportation, storage and identification of individual samples.

SUMMARY OF THE INVENTION

In accordance with a first aspect, embodiments of the present invention provide a device for use in the separation of biological samples into a solid component and a liquid component, wherein the device comprises:

(i) a front and back cover connected at a hinge portion such that said device is operable between an open position and a closed position;

(ii) a separation membrane arranged to retain the solid component and to allow the liquid component to pass therethrough;

(iii) an absorption membrane arranged to retain the liquid component; wherein said separation and absorption membranes are arranged in a layered structure between the front and back covers; and wherein opening the device from the closed position to the open position causes said separation and absorption membranes to bend thereby applying a compressive force to said membranes.

Thus it will be appreciated that embodiments of the present invention advantageously provide a device in which the separation and absorption membranes are pressed against each other when the device is open, aiding the separation of the solid and liquid components of the biological sample. The solid component, which may be a cellular component, is captured and stored on the separation membrane while the liquid component is able to pass through the separation membrane and is subsequently captured and stored on or in the absorption membrane.

The Applicant has appreciated that providing a close and temporary juxtaposition of the separation and absorption membranes may advantageously lead to efficient separation and collection of the biological sample. This close and temporary juxtaposition is achieved by pressing the membranes against one another. By layering the separation and absorption membranes in a stacked structure, a temporary, yet uniform, pressure is exerted on the membranes. The stacking of the separation and absorption membranes serves to place these two membranes in fluid communication with one another. In a preferred embodiment, the separation layer is arranged above the absorption layer. It will be understood that the term 'above' here means that, in use, the separation layer is physically closer to the point of contact that will be made with the biological sample upon its deposition.

Once the samples have been collected, the device can then be returned to the closed position. The device, together with the collected samples, is advantageously suitable for transportation via regular mail, either for intermediate testing of the sample, biobank storage, and/or wellness monitoring purposes. As a result, individuals interested in having their samples analysed with respect to biomarkers for health and nutritional status, (auto)immunity states, signs of ongoing or previous infection, etc. can simply prick their finger and send a sample by mail for analysis and advice on overall health, diet and exercise, etc.

A device in accordance with the present invention may also advantageously allow samples to be affordably collected from a very large number of donors with many consecutive samples harvested from each individual. Furthermore, samples from individuals that may be otherwise difficult to sample, e.g. small children or animals, are made achievable through the collection of small but adequate samples of dried blood using the device of the present invention. The portability of the testing made possible by the device of the present invention also means that it is of value in resource-poor settings, and where cold-chains for transporting collected samples may be difficult to maintain.

As outlined above, the front cover and back cover of the device are connected by a hinge portion, which allows the device to operate between the open position and closed position. As described herein, the term 'hinge portion' refers to a means, for example a joint, that allows the device to turn or pivot around a point. While the hinge portion could comprise a mechanical hinge, for example a butt hinge, barrel hinge, parliament hinge, etc. (i.e. a 'standard' type of hinge such as those used to mount doors to doorframes), in some embodiments, the hinge portion is a fold between the front cover and back cover. Thus, in accordance with such embodiments, the front and back covers may be of integral construction (i.e. a singular structure), divided into the 'front' and 'back' covers by the fold.

Thus, it will therefore be appreciated that the device having a hinge portion between a front cover and back cover gives rise to a 'book-like' or 'wallet-like' structure, providing for opening and closing of the device.

Additionally, the separation membrane and the absorption membrane may be fixed at, or close to, the hinge portion of the device on one side of the front cover and back cover, with the other end of the separation and absorption membranes not fixed to the device. Thus, in some embodiments, the separation membrane comprises a first fixed end and a first free end, and the absorption membrane comprises a second fixed end and a second free end, wherein the first and second fixed ends are fixed to the front cover or the back cover at, or close to, the hinge portion of the device, and the first and second free ends are fixed together and are free to move laterally with respect to the first and second fixed ends as the device moves between the open and closed positions. Thus, in some embodiments, the opening of the device pulls the free ends of the separation and absorption membranes towards the fixed ends.

The term 'free ends' is used herein to denote the ends of the specified membranes that are not fixed to the device, i.e. they can move laterally across the device. The term 'fixed ends' refers the ends of the specified membranes that are fixed or 'anchored' to the device, i.e. they cannot move laterally across the device.

In some such embodiments, the first and second fixed ends are fixed to the front cover or the back cover.

In some potentially overlapping embodiments, the separation membrane and absorption membrane are fixed by an anchor, for example an elongate anchor, that extends substantially across the width of the device, and preferably across the entire width of the device. In some such embodiments, the anchor fixes the separation membrane and absorption membranes to the front cover or the back cover. In a preferred embodiment, the free ends of the separation and absorption membranes are fixed to one another.

In some embodiments, the device may further comprise a straining portion. The straining portion may be stiff so as to impart a straining force on the separation membrane and absorption membrane. The straining portion is fixed at one end to one side of the front or back cover, while the other end is fixed to the free ends of the absorption membrane and/or separation membrane. In some such embodiments, the straining portion is positioned below the absorption membrane in the layered structure. In a preferred set of potentially overlapping embodiments, the straining portion is fixed to the free end of the absorption membrane.

The device may be sized appropriately for easy storage and transportation. However, in some embodiments the front and back covers are between approximately 2 cm and 25 cm long, for example between approximately 4.5 cm and 11.5 cm long, and may, in some embodiments, be approximately 7 cm long. In some potentially overlapping embodiments, the separation and absorption membranes are between approximately 2 cm and 8 cm long, for example between 3 cm and 7 cm long, and may in some embodiments be approximately 5 cm long.

In a set of potentially overlapping embodiments in which a straining portion is provided, the straining portion may be between approximately 5 cm and 10 cm long, and may in some embodiments be approximately 8.75 cm long.

Thus in some embodiments, the opening of the device pulls the free ends of the separation, absorption and straining portions towards the fixed ends. As such, the stiff straining portion imparts a compressive force on the separation and absorption membranes thereby inducing the bending of the absorption and separation membranes, leading to an enhanced 'straining' of the biological sample so as to aid in the separation of the cellular and liquid components. In this manner, liquids in samples applied to the separating membrane will be efficiently drawn to the underlying absorbing membrane by capillary forces, leaving the non-liquid components of the biological sample on the separating membrane.

In some embodiments, the front and back cover of the present device may comprise a paper-based material such as paper, paperboard, cardboard, cardstock, boxboard, containerboard, or fibreboard. In a set of preferred embodiments, the front and back covers are made from cardboard. In a set of potentially overlapping embodiments in which a straining portion is provided, the straining portion is preferably made from paper.

The term 'biological sample' may include, but is not limited to, blood, cerebrospinal fluid, urine, saliva, tear fluid, lymphatic fluid, tissue fluid, bronchi-alveolar lavage (BAL), ascites, etc. The biological sample may, for example, consist of a cellular component comprising the cells that make up said sample, and a liquid component, comprising the fluid component that make up said sample. The fluid component may further comprise soluble matter, such as proteins, genetic material (DNA or RNA), hormones, gases, glucose and other metabolites, electrolytes, etc. In a set of preferred embodiments, the biological sample comprises blood. In this example, the cellular component may comprise cells such as white blood cells, red blood cells and/or platelets. Whereas the fluid component, i.e. the blood plasma, would comprise soluble matter such as blood proteins, clotting factors, electrolytes, glucose, etc.

In some embodiments, the liquid component of the sample passes through the separation membrane and is absorbed onto the absorption membrane under the force of gravity. However, the liquid component of the sample passes through the separation membrane and is absorbed onto the absorption membrane by capillary action. The terms "capillary action", "capillary suction" and "wicking" may be used interchangeably to refer to the ability of a liquid to flow in narrow spaces without the assistance of, and in some cases may be against, the force of gravity.

The separation membrane comprises a filter paper that filters the liquid component of the biological sample, while capturing the solid, e.g. cellular, components. Some suitable filter papers, known in the art per se, include e.g. WHATMAN® 3 MM, GF/CM30, GF/QA30, S&S 903, GB002, GB003, GB004, or Pall® Vivid Plasma Separation Membrane. In some embodiments, the separation membrane is formed from the Vivid Plasma Separation Membrane filter paper. In some potentially overlapping embodiments, the separation membrane may be grade GF, GX or GR of the Vivid Plasma Separation Membrane filter paper. In at least some preferred embodiments, the separation membrane is grade GR of the Vivid Plasma Separation Membrane filter paper.

There may be a single separation membrane for the collection of solid components of the biological sample, however in some embodiments, there may be a plurality of separation membranes, which may each be arranged to capture a different solid component of the biological sample, e.g. different cellular components and/or other types of solid components. For example, one separation membrane may capture white and red blood cells, while another separation membrane may capture blood platelets, while plasma is transmitted to the absorption membrane.

The absorption membrane may comprise an absorptive paper that captures the liquid component of the biological sample. Several categories of sample collection materials able to act as absorption membranes are known in the art per se. For example, S&S 903 cellulose (which may be wood or cotton derived) and/or WHATMAN® sample collection cards. In some embodiments, the absorption membrane may comprise the Whatman 903 and/or Whatman Grade 1 paper. In preferred embodiments, the absorption membrane comprises Whatman Grade 1 paper.

In some embodiments, the separation membrane and/or filtering membrane may have active agents impregnated therein. The active agent can influence a biological process. For example, in some embodiments, the active agent may inhibit a biological process. In other embodiments, the active agent may preserve the sample. In preferred embodiments, the active agent is an inhibitor, preserving the biological sample by protecting the sample from degradation. Such active agents may include, but are not limited to, either chemical or protein-based RNase inhibitors, DNase inhibitors, or protease inhibitors, etc. In a set of embodiments in which the device comprises a plurality of separation membranes as outlined above, some or all of said separation membranes may be impregnated with active agents such as those listed above. The separation membrane(s), in some embodiments, may further provide a solid support for subsequent detection assays. For example, in a particular embodiment, immobilised capture antibodies could be used to capture specific viruses present in the biological sample. Such viruses, specifically recognised by the immobilised antibodies, would be captured on the separation membrane(s) and the presence of a specific virus in the blood sample can be subsequently determined.

When viewed from a second aspect, the present invention provides a method of separating biological samples into a solid component and a liquid component using a device in accordance with embodiments of the first aspect of the invention, the method comprising:

opening the device;
providing a sample from a subject;
applying said sample to the layered structure;
allowing the biological sample on the layered structure to substantially dry; and
closing the device.

The term 'subject' as used herein includes any human or non-human animal subject, including any human or non-human mammal, bird, fish, reptile, amphibian, etc. However, in preferred embodiments the subject is a human mammal, e.g. a human patient. In other embodiments, the sample may be derived from an industrial process such as biofermentation.

In some embodiments, the sample is provided by a subject by an invasive method. In other embodiments, the sample is provided by a subject by a non-invasive method. Preferably, the sample is provided by a non-invasive means. For example, the sample may be provided by a non-invasive means, e.g. finger prick and the biological sample is blood. In some additional embodiments, the device of the present invention may be part of a kit which is supplied with a needle, thereby providing a subject with a means by which the blood sample can be obtained.

In one embodiment, after the sample is dried a separating leaflet may optionally be provided, for example in a kit of parts, to interleave the separation membrane and the absorption membrane. Thus the method may comprise inserting a separating leaflet between the separation membrane and the absorption membrane after applying the sample to the layered structure, and optionally after allowing the biological sample on the layered structure to substantially dry. This separating leaflet may, in some embodiments, be impermeable to the cellular and liquid components of the biological sample. This separating leaflet may prevent a 'reverse-transmission' of the components, for example to prevent the liquid component 'leaking' back onto the separation membrane(s).

The method may, in some embodiments, further comprise removing the samples collected on the separation membrane and absorption membrane. In one embodiment, each of the separation and absorption membranes may be non-destructively detachable from one another. In such an embodiment, the separation membrane and absorption membrane, and the samples captured thereon, can be separately isolated. In other embodiments, the retrieval of the dried cellular and liquid samples may be achieved using mechanical means, e.g. using a puncher. For example, punching a portion of the samples out can be achieved without including any material above or below each of the separation and absorption membranes. In other words, the separation and absorption membranes can be separately retrieved through punching a portion of these membranes out after the sample has been supplied and allowed to dry.

Alternatively, in other embodiments, the samples may be punched out by punching through the front cover and/or back cover of the device. Such a means of removal allows, for example, an easy and cost effective means to obtain the separate samples captured on the separation membrane and absorption membrane.

Thus, in some embodiments, the front and back covers may be made from a hole-punchable material. Those skilled in the art will appreciate that this means a material suitable for a substantially circular 'core' to be removed by a bladed punch member, where the punch member is typically substantially cylindrical. This hole-punch operation may remove a cross-sectional core of the device including a section of each of the separation and absorption membranes containing the cellular and liquid components of the biological sample respectively, where the portions of the front and/or back covers removed by the hole-punch may be discarded. This approach may allow for straightforward mechanisation of the removal of the samples for subsequent analysis.

The Applicant has appreciated that additional means may be provided to exert the compressive force on the layered separation and absorption membranes. Thus, in some embodiments, the device comprises a manually-operable actuation member arranged to cause further bending of the separation and absorption membranes, thereby applying a further compressive force to said membranes. In some such embodiments, the manually-operable actuation member comprises a pull cord, wherein pulling of the pull cord causes said separation and absorption membranes to bend thereby applying the further compressive force to said membranes.

Such an arrangement is novel and inventive in its own right and thus, when viewed from a third aspect, the present invention provides a device for use in the separation of biological samples into a solid component and a liquid component, the device comprising:

(i) a front cover and a back cover connected at a hinge portion such that said device is operable between an open position and a closed position;

(ii) a separation membrane arranged to retain the solid component and to allow the liquid component to pass therethrough;

(iii) an absorption membrane arranged to retain the liquid component; and (iv) a manually-operable actuation member;

wherein said separation and absorption membranes are arranged in a layered structure between the front and back covers; and wherein the manually-operable actuation member is arranged such that, when operated, the actuation member causes said separation and absorption membranes to bend thereby applying a compressive force to said membranes.

In some embodiments, the manually-operable actuation member comprises a pull cord, wherein pulling of the pull cord causes said separation and absorption membranes to bend thereby applying the compressive force to said membranes.

Thus it will be appreciated that this third aspect provides a device that may use additional or alternative means by which the functional membranes, i.e. the separation and absorption membranes, are induced to bend. In this particular aspect of the invention, the bending of the functional membranes may not necessarily occur as a result of the mechanics of opening of the device. Rather, in such embodiments included in the third aspect, the device is opened and a pull cord is subsequently pulled to induce bending of the functional membranes, thereby applying a compressive force to said functional membranes. Of course, in a set of embodiments, the opening of the device may also cause bending of, and thus a compressive force on, the membranes as outlined above.

The Applicant has also appreciated that it may be very important to be able to attribute collected samples to the correct subject. For example, in a biobanking system, samples may be collected from thousands of different subjects, and knowing which sample came from which patient is very important. When the devices outlined above are supplied to subjects, these may be given with some form of identifier, such as a serial number, provided on them in order to provide a relatively cheap way of tracking which sample belongs to which subject. Alternatively, some form of identification hardware, such as a radio frequency identification (RFID) chip, could be embedded or attached to the device.

However, these approaches may not be satisfactory in all applications—additional hardware may be expensive, and assigning specific devices to specific subjects risks these being mixed up, for example if multiple subjects live in the same house and store the devices in the same place (i.e. Subject A might accidentally use Subject B's device, leading to Subject A's data potentially being stored in Subject B's records at the biobank). Thus, in some embodiments, an optical marker is provided on the device for scanning by a user using an external device to associate the biological sample with the subject, optionally wherein the optical marker comprises a barcode or, in some preferred embodiments, a Quick Response (QR) code. Thus, in some arrangements, each device may have a unique QR code printed, e.g. on the front and/or back cover, that they can scan using a device such as a smartphone or tablet that attributes the biological sample to a subject identified by the device. For example, the device may run an application (or 'app') where the details of the subject are captured, either at the time of sample or through log in credentials, i.e. the subject may have to log in to the app using a username and password that uniquely identifies them.

Thus in some embodiments of the second aspect of the invention, the method further comprises using an application on an external device to scan an optical marker on the device. In a set of such embodiments, the method further comprises logging in to the application using user credentials, optionally wherein the application is arranged to verify the user credentials or wherein the user credentials are verified using a remote server. It will be understood that the term 'user credentials' may mean a username and password, but also encompasses other forms of credentials including but not limited to biometric identification (e.g. fingerprint recognition, facial scanning, iris scanning, etc.) or physical tokens (e.g. a card reader or hardware authenticator). In some embodiments, a log process may not be necessary as an authorised session on the external device (e.g. a user's existing authenticated session on their smartphone) may be used to provide the user credentials.

The optical marker (e.g. QR code or similar) may link a particular sample collection event to the device holding that sample. This optical marker is preferably located on the device in a position that is readable when the device is stored such that even when many such devices are placed in a stack, the desired device can be retrieved from the stack (which may be positioned in a suitable holder), e.g. in a refrigerated space. As the sample is divided upon collected into two (or more) fractions, i.e. the solid and liquid components (e.g. blood cells and plasma), these may need to be identified separately so as to record when an aliquot is taken from either fraction of the collected sample. Thus in a set of preferred embodiments, the optical marker is positioned on the hinge of the device. In accordance with such embodiments, the optical marker is positioned on the 'spine' of the book-like device.

In some embodiments, the device may comprise a plurality of optical markers. This may be useful, for example, where separate optical markers are desired to identify the solid and liquid components separately. It is contemplated that separate QR codes or other identifiers could be applied to the two functional membranes to ensure that the source of aliquots retrieved from the membranes, e.g. cells or plasma, can be correctly identified. It is also contemplated that separate QR codes or other identifiers may be applied anywhere on the device, e.g. on the inside and/or outside of the front and/or back covers, or on a 'spine' of the device (i.e. on an exterior surface of the hinge portion).

When viewed from a fourth aspect, the present invention provides a method of identifying a biological sample taken with a device according to embodiments of the first aspect of the invention, the method comprising:

- receiving user credentials and using said user credentials to retrieve a user identifier;
- scanning an optical marker on the device to retrieve a device identifier; and
- storing the user identifier and device identifier as a linked pair in a database.

This fourth aspect of the present invention extends to a non-transitory computer-readable medium comprising instructions that, when executed on a processor, cause the processor to carry out a method of identifying a biological sample taken with a device according to embodiments of the first aspect of the invention, the method comprising:

- receiving user credentials and using said user credentials to retrieve a user identifier;
- scanning an optical marker on the device to retrieve a device identifier; and
- storing the user identifier and device identifier as a linked pair in a database.

The step of storing the user identifier and device identifier as a linked pair in a database may, at least in some embodiments, comprise transmitting the user identifier and device identifier to a remote server that contains the database.

When the device is analysed, for example by a biobank, the optical marker may be scanned in order to determine the user identifier and/or device identifier, such that measurements and conclusions relating to the cellular and liquid components of the biological sample can be stored in a database in relation to the correct subject.

Where multiple optical markers are provided, these may provide sample identifiers (in addition to, or instead of, device identifiers) associated with the solid and liquid samples, such that these can be identified independently. These may be stored as linked pairs or groups (with or without a device identifier, depending on whether a device identifier is in use) with the corresponding user identifier in the database as appropriate. These sample identifiers may be treated in the same manner that the device identifiers are in the embodiments described herein.

This app may have a simple and accessible interface that tells the user what it is about and offering a few simple choices, depending on what uses are needed.

The app may, for example, include a small tutorial regarding how the device should be handled by the user, and the tutorial could also include a video describing how samples are collected to help ensure standardized sample collection.

By scanning the optical marker (e.g. the QR code) on a sample collection device, this may, at least in some embodiments, result in the sample being time-stamped. Additionally or alternatively, a time-stamp may be acquired and associated with the sample via a smartwatch connected to the external device.

The app may also, at least in some embodiments, provide an opportunity to add information that may be relevant regarding the samples, for example by allowing a user to fill in a 'notes' field with additional information. This information can be generic or structured according to specific studies that the samples will be part of, for instance the evaluation of a new drug, and the app should be constructed so that different versions can be easily prepared depending on the additional information required for a given study. Additionally or alternatively, if samples other than the main sample of interest (e.g. blood) are collected (e.g. urine, saliva, CSF or fine needle biopsies), these may be documented by the user.

For some further, potentially overlapping, purposes this annotation may involve capturing further images, for example of a healing wound. Additionally or alternatively, a sound recording may be supplied through the app, which may provide audio of e.g. breathing or heart sounds.

The app may keep a historical record of all samples collected by an individual and when these were retrieved, and may be arranged to display these on a timeline.

For applications such as clinical studies, information about samples having been collected could be transferred to a person in charge of the study, and this person may also need to send messages to study participants via the app. Additional functions may be needed to gain an overview of the collection of samples from all participants in a study. This documentation could be combined with information about the results of analyses of the samples.

A scan may also be taken of the QR code whenever stored sample aliquots are retrieved from a card, to efficiently connect the sample identity to the results of the analysis performed. As outlined above, separate QR codes may be provided for each of the separation and absorption membranes (e.g. on the membranes or elsewhere on the device) such that the cellular and liquid components of the biological sample can be identified independently. For automated aliquot retrieval by hole-punching as outlined above, a camera may take pictures (which may be stored) in order to provide an indication of how many more aliquots may be collected from the sample device.

Possibly some or all results from analyses of collected samples may be fed back to the donor via the app. This may increase the donors' willingness to continue providing samples. Additionally or alternatively, for some studies the user may receive some form of a reward for collecting the samples, and this could be provided via the app.

The app may also include information about what analyses the donor of the samples agrees to, what study or studies the samples can be part of etc. Information about ethical permits and stipulations therein could also be available via the app.

In some embodiments, the sample could additionally or alternatively be derived from biofermentation. The Applicant has appreciated that the present invention may be extended to other applications, including non-biological samples comprising liquid and solid (e.g. particulate) matter to be separated by filtration, followed by drying. As such, when viewed from a fifth aspect, the present invention provides provide a device for use in the separation of a sample into a solid component and a liquid component, said sample comprising the solid and liquid components, wherein the device comprises:

(i) a front and back cover connected at a hinge portion such that said device is operable between an open position and a closed position;

(ii) a separation membrane arranged to retain the solid component and to allow the liquid component to pass therethrough;

(iii) an absorption membrane arranged to retain the liquid component;

wherein said separation and absorption membranes are arranged in a layered structure between the front and back covers; and wherein opening the device from the closed position to the open position causes said separation and absorption membranes to bend thereby applying a compressive force to said membranes.

In respect of this fifth aspect, the term 'sample' is intended to cover both biological and non-biological samples including both a liquid component and a solid component.

It will be appreciated that any and all optional features described in relation to embodiments of any given aspect of the invention apply equally to any and all other aspects of the invention as appropriate.

BRIEF DESCRIPTION OF THE DRAWINGS

Certain embodiments of the present invention will now be described with reference to the accompanying drawings, in which.

DETAILED DESCRIPTION

Figure 1:
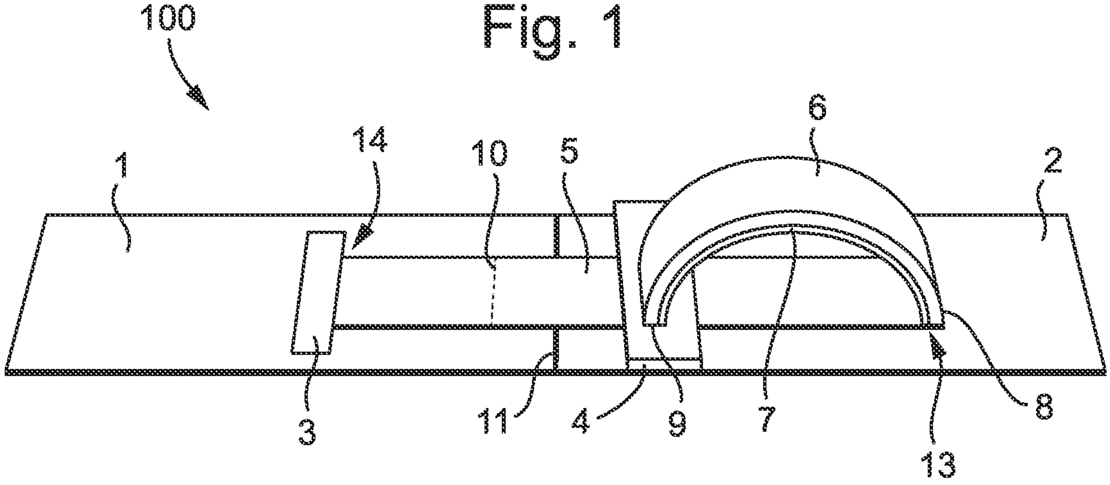
FIG. 1 is a schematic drawing providing a perspective view of a device in accordance with an embodiment of the present invention when in the open position.
Figure 2:
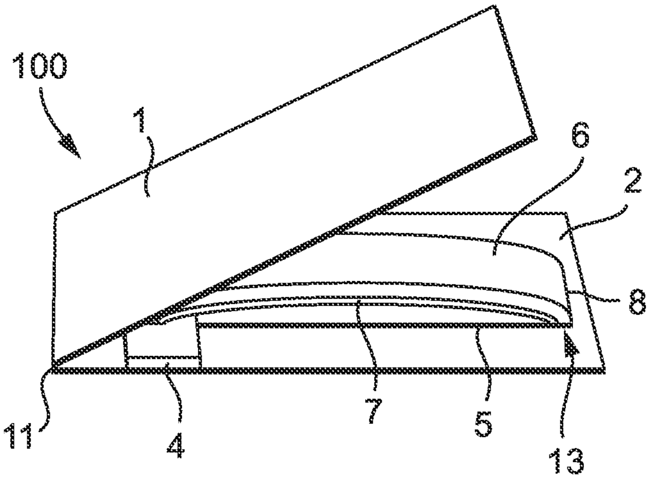
FIG. 2 is a schematic drawing providing a perspective view of the device in a partially open position.
Figure 3:
FIG. 3 is a schematic drawing providing a perspective view of the device in the closed position.

FIGS. 1 to 3 are schematic drawings that show a device 100 in accordance with an embodiment of the present invention. Specifically, these schematic drawings show the device 100 in three different configurations: open, partially open, and closed in FIGS. 1, 2, and 3 respectively.

Specifically, FIGS. 1 and 2 show the device 100 of the present invention which comprises a front cover 1 and back cover 2, connected by a hinge portion 11. The front cover 1 and back cover 2 are fixed to one another at the hinge portion 11. This fixation could be achieved in a variety of ways, for example, through the use of an adhesive such as glue or adhesive tape, and the hinge portion 11 could comprise a standard hinge, e.g. a door hinge. However, in this particular embodiment, the hinge portion 11 is provided by a fold between the front cover 1 and back cover 2, which are of integral construction and, in this embodiment, are made from the same piece of cardboard.

As can be clearly seen from FIG. 1, the device 100 further comprises functional membranes: a separation membrane 6 and an absorption membrane 7, arranged in a stacked or layered structure. In the particular embodiment depicted in FIG. 1, the separation membrane 6 and, under this, the absorption membrane 7 are bent and juxtaposed to compress the membranes tightly against one another. The separation membrane 6 may, for example, be the WHATMAN® 3 MM, GF/CM30, GF/QA30, S&S 903, GB002, GB003, GB004, or Pall® Vivid Plasma Separation Membrane. The absorption membrane 7 may, for example, be S&S 903 cellulose (wood or cotton derived) or WHATMAN® sample collection cards, such as the Whatman 903 or Whatman Grade 1 paper.

Figure 5:
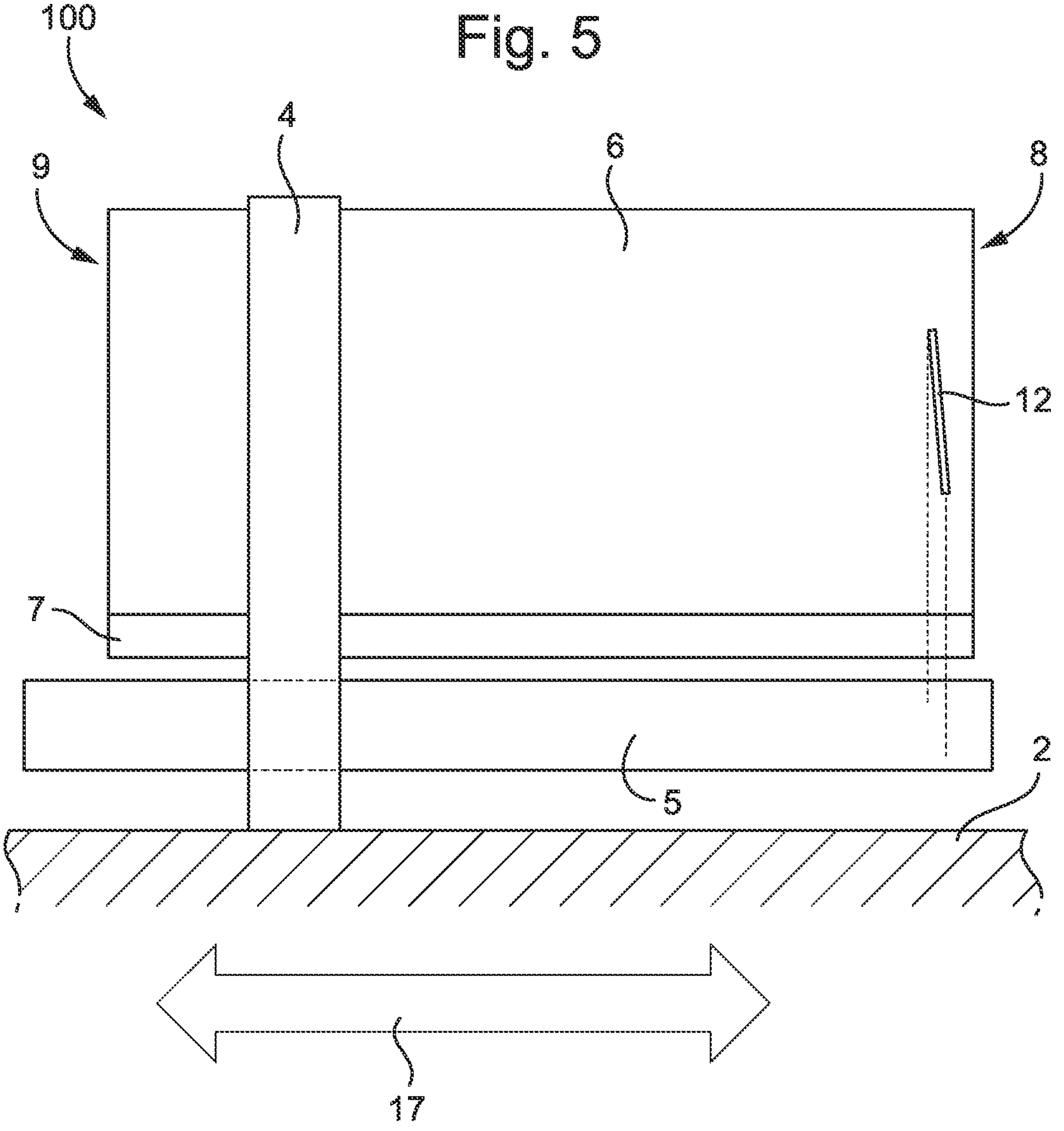
FIG. 5 is a schematic drawing providing a view of the functional membranes of the present invention arranged in a stacked structure.

FIGS. 1 and 2 also depict the free ends 8 of the membranes 6, 7, which in this embodiment, are not fixed to the back cover 2 of the device 100. The free ends 8 of the separation membrane 6 and absorption membrane 7 are connected to one another by, for example, an adhesive substance or by stapling the separation membrane 6 and absorption membrane 7 together, as shown in FIG. 5. As can be seen in FIG. 1, the fixed ends 9 of the separation and absorption membranes 6, 7 are fixed to the back cover 2 by an elongate anchor 4, which allows a straining portion 5 to slide laterally across the back cover 4 under the 'tunnel' formed by the elongate anchor 4.

The straining portion also has free ends 13, which may be attached to the free ends 8 of the separation and absorption membranes 6, 7 by, for example, an adhesive or by a staple, as described below with reference to FIG. 5. The function of this straining portion 5 is to pull the free ends of 13 of the separating and absorption membranes 6,7 closer to the hinge portion 11. This will have the effect to bend the two membranes 6,7 and, in the process, force them in close contact with one another to ensure efficient wicking of liquids from biological samples deposited on separation membrane 6 onto the absorption membrane 7. The fixed end 14 of the straining portion 5 may be attached to the device front cover 1 by a backing portion fixation 3. The straining portion 5 also comprises a straining portion fold 10, which serves to permit the folding of the straining portion 5 when closing the device 100.

FIG. 3 shows the device 100 when fully closed. It can be readily appreciated from this that the device 100 allows for easy storage and transportation (including transport via regular mail). Furthermore, multiple individual devices, such as the device 100 depicted in FIG. 3, can be readily stacked and stored in a manner analogous to that of stacking a bookshelf with books.

Figure 4:
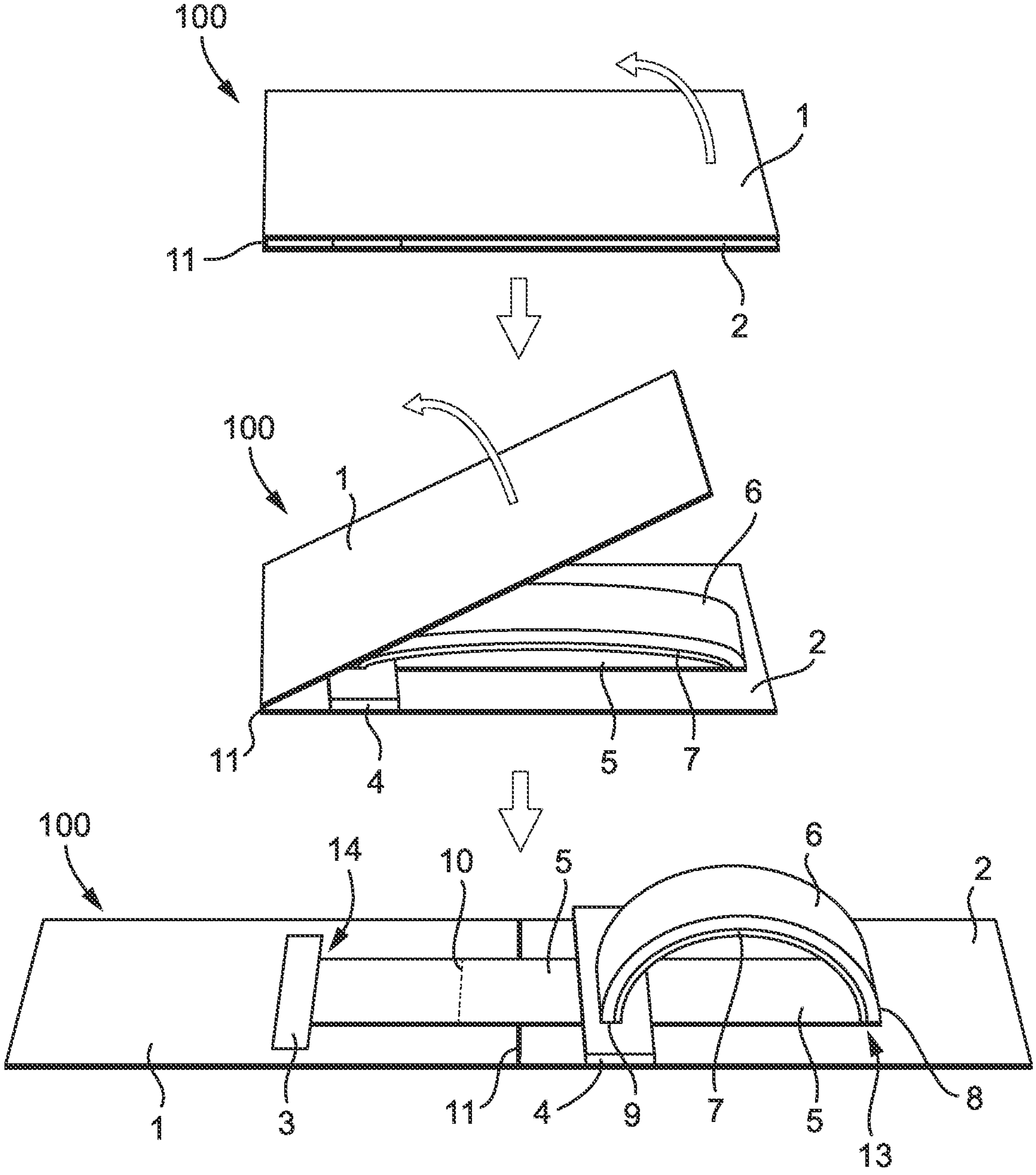
FIG. 4 is a schematic drawing illustrating the transition of the device from the closed position to the open position.

FIG. 4 shows the transition from the closed position as shown in FIG. 3 to the open device as shown in FIG. 1 (via the partially open position of FIG. 2). From this figure it is clear that the hinge portion 11 allows for pivoting of the device about the fold, permitting the motion of the front cover 1 away from the back cover 2.

As shown in FIGS. 1 and 2, and again in FIG. 4, the free ends 8 of the membranes 6, 7 are pulled towards the separation and absorption membrane fixation 9 and the straining portion fixation 3. The straining portion 5 provides a relatively stiff actuator that acts to pull the free ends 8 toward the hinge portion 11, thereby causing the membranes 6, 7 to bend upwards and thus to impart a compressive 'straining' force on the separation membrane 6 and absorption membrane 7, i.e. they are squeezed together as the stacked layers 6,7 'arch' upwards, with the straining portion 5 remaining flat.

Thus, upon opening the device, the free ends of the straining portion 13 slide along the back cover 2 thereby pulling the free ends 8 of the membranes 6,7 closer to the hinge portion 11 of the device 100. This pulling of the free ends 8 of membranes 6,7 by 13 serves to bend the two membranes 6,7. This forces membrane 6,7 into close contact and compresses membranes 6,7 such that they become held together tightly. A relatively uniform pressure is therefore imparted on membranes 6,7 when the device 100 is opened as a compressive force is applied to the membranes 6,7. This serves to ensure efficient wicking of liquids from biological samples deposited on separating membrane 6 onto the absorbing membrane 7. It can be clearly seen from the accompanying drawings how the separation membrane 6 and absorption membrane 7 become tightly pressed against one another as they bend.

When the device 100 is in the open configuration as shown in FIG. 1, the biological sample—which may be, for example, blood—is applied to the apex of the layered structure formed from the separation membrane 6 and absorption membrane 7. As described above, the separation membrane 6 comprises a filter that filters the liquid component of the biological sample, while capturing the solid cellular components which, in this example, are blood cells. The absorption membrane 7 comprises an absorptive paper that captures the liquid component of the biological sample, in this example blood plasma.

The liquid component of the biological sample, i.e. the blood plasma in this example, will be drawn through the separation membrane 6 and will collect on the absorption membrane 7. This may be driven by capillary action, whereby the absorption of the liquid component onto the absorption membrane 7 serves to drive the flow of the liquid component through the separation membrane 6. In order to obtain effective separation of the biological sample, it is advantageous to provide a uniform pressure applied across the layered separation membrane 6 and absorption membrane 7. The bending of the separation membrane 6 and absorption membrane 7 as depicted in FIG. 1 serves as an effective means by which the substantially uniform pressure is exerted on separation membrane 6 and absorption membrane 7.

It will be appreciated that the opening of the device bends the separation and absorption membranes 6, 7 in a manner similar to so-called 'pop-up books', insofar as the act of opening a book to a new pair of pages pulls on the paper fixed to said pages thereby causing the paper to rise out of the pages where they had previously been lying flat.

Once the biological sample is applied to the apex of the layered structure formed from the separation membrane 6 and absorption membrane 7, the sample should be given sufficient time to become separated into the cellular component and subsequently substantially dry before the device 100 is returned to the closed position as shown in FIG. 3. Depending on the type of sample and materials chosen, the amount of time needed for drying will vary—however instructions may be readily provided to the user regarding how long they should leave the device 100 open for drying in accordance with the intended application.

Separating and drying biological samples on separate membranes 6, 7 is an attractive approach to collect and maintain samples. This can serve to stabilise samples by, for example, reducing enzymatic activity in the dried state, either for short- or long-term storage, thereby simplifying the standardisation of sampling. The act of drying may also serve to remove well-known variables leading to inconsistent processing, for example, due to haemolysis or other forms of cell death, nucleic acid or protein degradation, or other changes, e.g. post-translational modifications of proteins. The material obtained from, for example, single drops of dried blood suffices for many different types of analyses. Several small aliquots of the same dried blood sample may be utilised for analysis of, for example, nucleic acids, proteins or metabolites, etc.

Upon closing the device 100, the free ends 8 of the membranes 6, 7 will move away from the separation and absorption membrane fixation 9 and the straining portion fixation 3. As such, the separation membrane 6 and absorption membrane 7 will no longer be compressed and will resume a flat position; thereby allowing the front cover 1 and back cover 2 to close over the separation membrane 6, absorption membrane 7 and straining portion 5.

FIG. 5 provides a closer look at the functional membranes 6, 7 of the present invention arranged in a stacked structure. It will be appreciated that FIG. 5, as with the other drawings, provide only a schematic illustration and are not drawn to scale.

As outlined above, the separation membrane 6 and the absorption membrane 7 are arranged in a stacked or layered structure. The biological sample which may be, for example, blood is applied to the separation membrane 6. In the particular embodiment depicted in FIG. 5, the separation membrane and absorption membrane 6, 7 are held together by staples 12. This staple 12 serves to anchor the free ends 8 of the separation and absorption membranes 6, 7 to one another. The elongate anchor 4 at the fixed ends 9 anchors the separation and absorption membranes 6, 7 to the back cover 2, such that the membranes 6, 7 and the straining portion 5 slide under the 'tunnel' made by the anchor 4, along the direction shown by the arrow 17.

Figure 6:
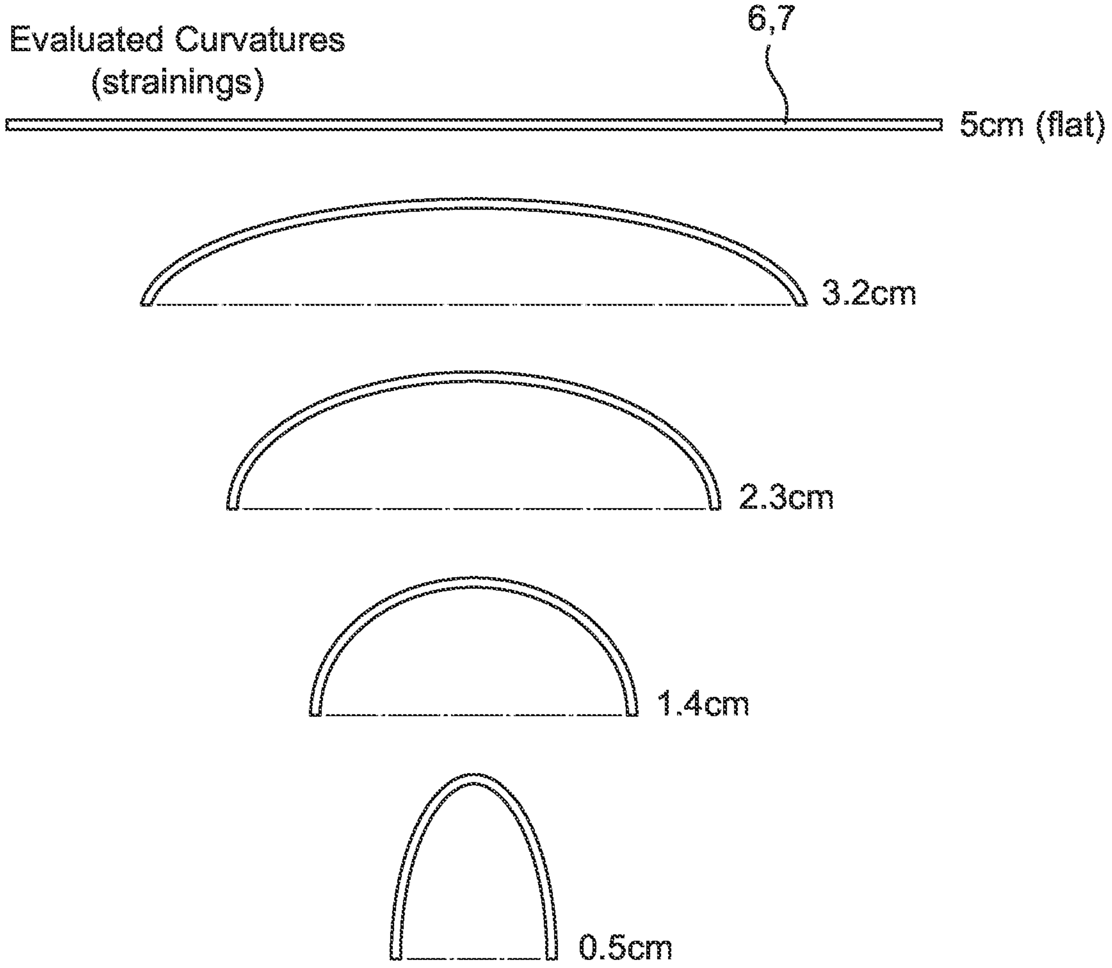
FIG. 6 is a schematic drawing providing a view of the functional membranes showing varying degrees of bending and distances between either end.

FIG. 6 shows some different curvatures of the stacked separation membrane 6 and absorption membrane 7 tested to determine some suitable curvatures for efficient wicking of the liquid component of the biological sample onto the absorption membrane 7. The separation membrane 6 and absorption membrane 7 were arranged as depicted in FIG. 5, that is, with the separation membrane 6 on top of the absorption membrane 7.

In this particular experimental set-up, the Vivid grade was used as the filter paper for the separation membrane 6, and the Whatman Grade 1 paper was used as the absorption membrane 7. In this particular embodiment, the membranes 6, 7 are 5 cm long when laid flat, i.e. when the membranes 6, 7 are not subject to any kind of bending.

When applying the various curvatures shown in FIG. 6, it was found that more efficient wicking was observed for the shorter set-ups. Specifically, more efficient wicking was observed for the 0.5 cm, 1.4 cm and 2.3 cm set-ups than in the 5 cm (flat) set-up and 3.2 cm set-ups, but the most suitable dimensions may, in practice, depend on the particular membranes used.

Figure 7:
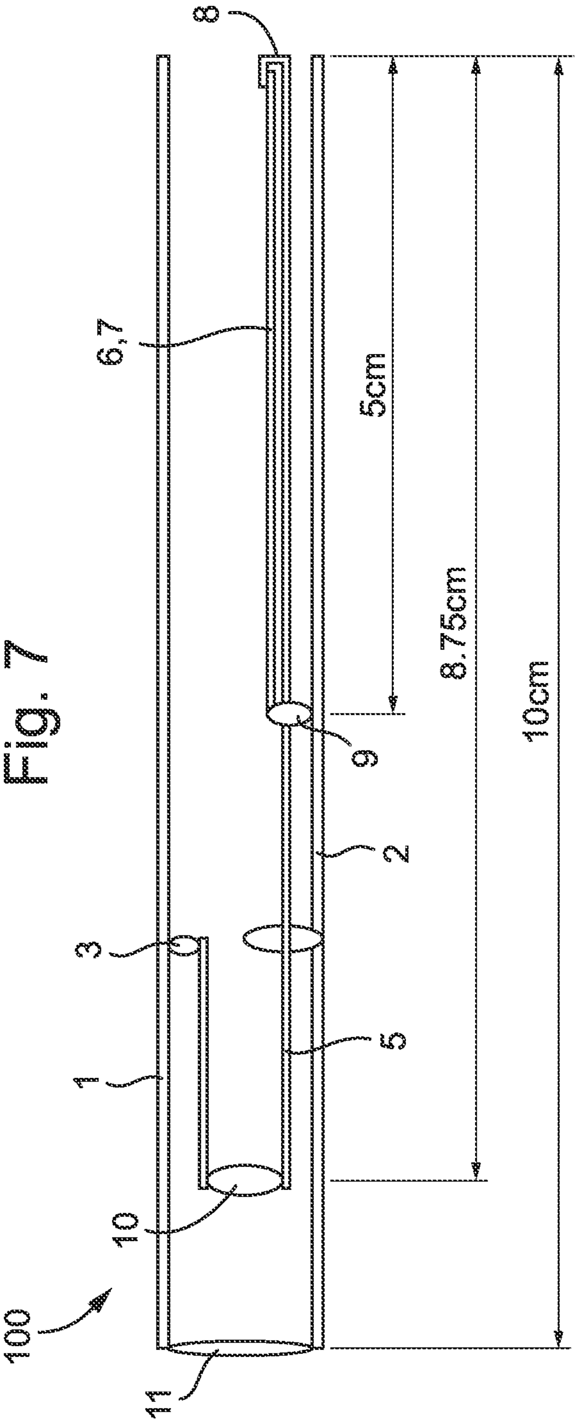
FIG. 7 is a schematic drawing providing a side-on view of the closed device showing some exemplary device measurements.

FIG. 7 depicts the device 100 of the present invention in a closed configuration and provides a cross-sectional view such that some exemplary dimensions of the device 100 can be seen. In this specific embodiment, the front and back covers 1, 2 are 10 cm long, the straining portion 5 is 8.75 cm long, and the separation and absorption membranes 6, 7 are 5 cm long. However, it will be appreciated that other lengths could be used instead.

Figure 8:
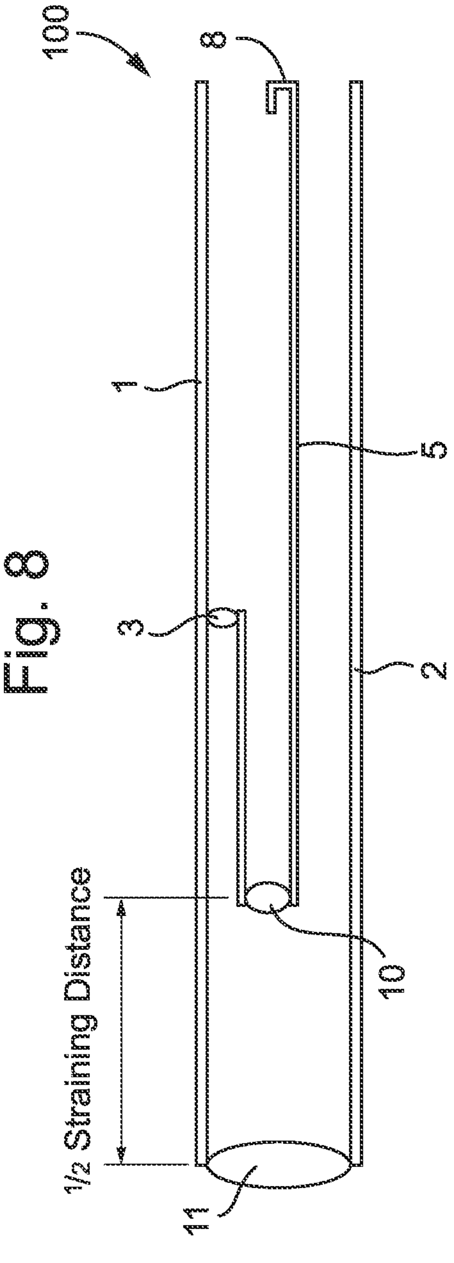
FIG. 8 is a schematic drawing providing a simplified side-on view showing the ½ straining distance.
Figure 9:
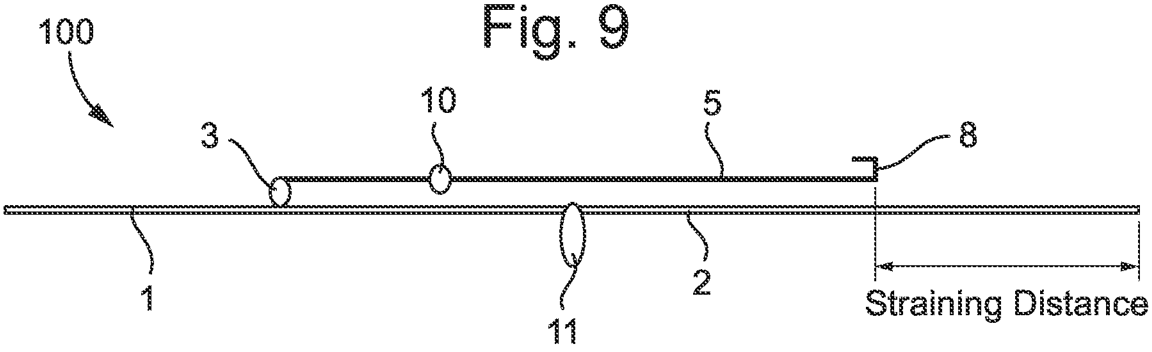
FIG. 9 is a schematic drawing providing a simplified side-on view of the open device, showing the straining distance.

FIG. 8 and FIG. 9 show simplified forms of the device 100 that omit the separation membrane 6 and the absorption membrane 7 for illustrative purposes, in a closed and open configuration respectively. FIG. 8 further shows the half-straining distance of the straining portion 5. FIG. 9 shows the full straining distance of the straining portion 5. As discussed above, the straining portion 5 is substantially 'stiff' and constrained to slide along 2, so as to exert a pull on the separation membrane 6 and absorption membrane 7 and to impart an 'upward' compressive straining force on these membranes 6, 7 is applied upon opening the device 100.

Figure 10:
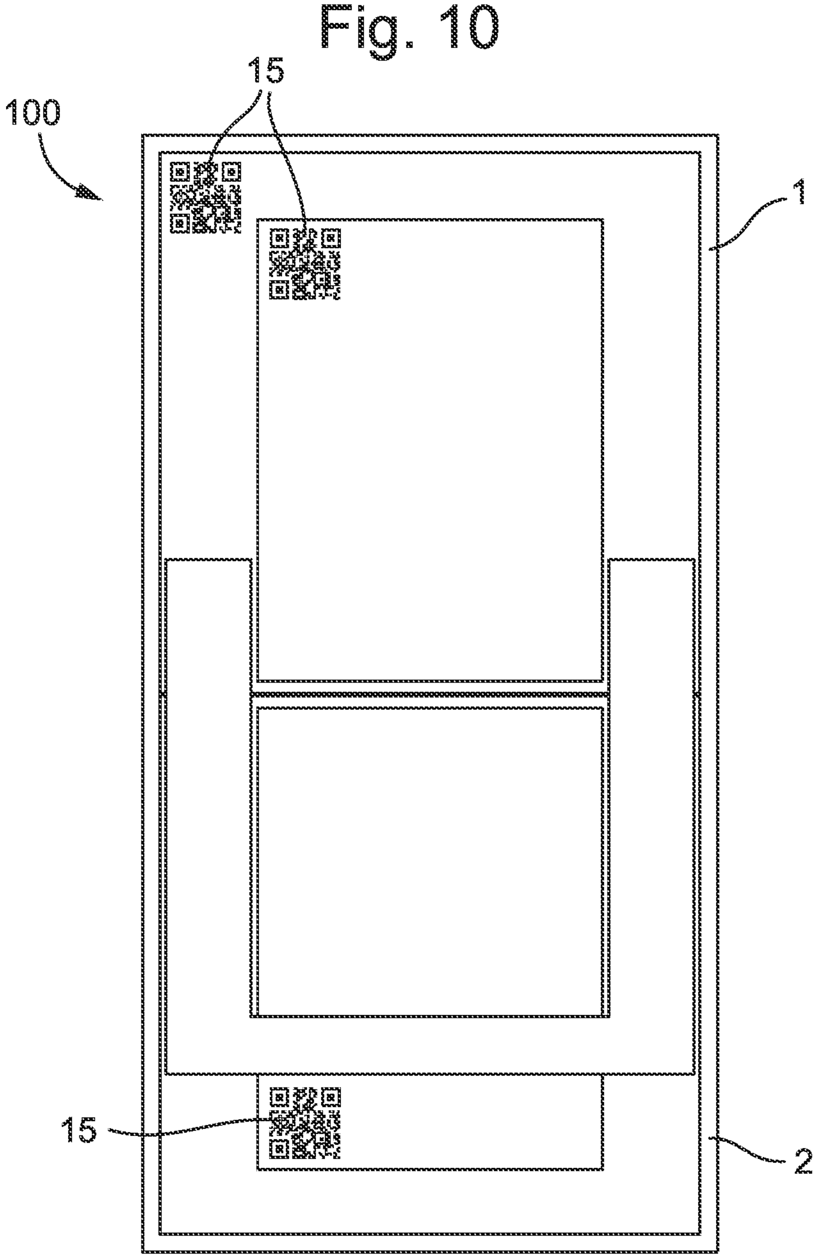
FIG. 10 is a schematic drawing providing a view of an optical marker on the device.

As outlined previously, the pulling of the free ends 8 of the membranes 6, 7 towards the fixed ends 9 of the membranes 6, 7 and straining portion fixation 3 allows the stiff straining portion 5 to exert a force on the separation membrane 6 and absorption membrane 7. This forces the separation membrane 6 and absorption membrane 7 to bend and compresses these membranes 6, 7 such that they become tightly held together. In this particular embodiment, the straining distance as shown in FIG. 9, is 2.5 cm, however other values could readily be used instead, depending on the choice of membrane for separation and absorption of the sample components FIG. 10 is a schematic drawing providing a view of optical markers 15 on the device 100. Specifically, FIG. 10 illustrates the provision of QR codes 15 on the front and back covers 1, 2 of the device 100. In this embodiment, each device 100 has a unique QR code 15 printed on both the front and back covers 1, 2, however it will be appreciated that these QR codes 15 could be printed elsewhere on the device 100 or added to the device 100 via some other means (e.g. an adhesive sticker). For example, it may be advantageous to print the QR codes 15 on the 'spine' of the device, i.e. on the exterior part of the hinge 11, such that the QR code 15 may be scanned easily when the device 100 is within a stack, thus allowing the samples associated with that device to be readily identified. Further, it may also be advantageous to read the same QR codes in the opened state, for example, while taking a picture after punching out a sample aliquot.

These QR codes 15 are useful in identifying which sample came from which subject when the devices 100 are collected, e.g. by a biobank. When the devices 100 outlined above are supplied to subjects, for example human patients, a user can scan the QR code 15 using an external device to associate the biological sample with the subject, where this 'external device' may be a device such as a smartphone or tablet that has a camera suitable for scanning the QR code 15 in a means known in the art per se. In another example, separate QR codes or other identifiers could be applied to the two membranes to ensure that the source of aliquots retrieved from the membranes, e.g. cells or plasma, can be correctly identified. Though, it will be appreciated that separate QR codes or other identifiers may be applied anywhere on the device.

For example, the device may run an application (or 'app') where the details of the subject are captured. Specifically, in this embodiment, the user must supply log in credentials, i.e. the user (which may be the subject themselves or another person assisting the sampling of the subject such as a friend, family member, carer, nurse, doctor, clinician etc.) must log in to the app using a username and password that uniquely identifies them or the subject. The user credentials may be verified, e.g. locally or via a remote server, and result in the proper selection of the correct user identifier relating to the subject or user.

Once logged into the app, the QR code or codes 15 can be scanned, 'tying' a device identifier associated with the device 100 to the user identifier associated with the subject or user, and the user identifier and device identifier can be stored together as a linked pair in a database, either locally or remotely as appropriate, such that samples collected on the device 100 as outlined above are properly attributed to the correct subject. Generally, the linked pair of user identifier and device identifier will be transmitted to a remote server that contains the database, for example to a biobank that collects the devices 100.

At the biobank itself, the QR code or codes 15 may be scanned in order to determine the user identifier and device identifier, such that measurements and conclusions relating to the cellular and liquid components of the biological sample can be stored in a database in relation to the correct subject.

Sample identifiers may be provided in addition to, or instead of, the device identifier. These sample identifiers may relate to the specific solid and liquid samples (i.e. correspond to the membranes 6, 7 themselves), and these identifiers may be stored in the database, linked to the correct user identifier.

Figure 11A:
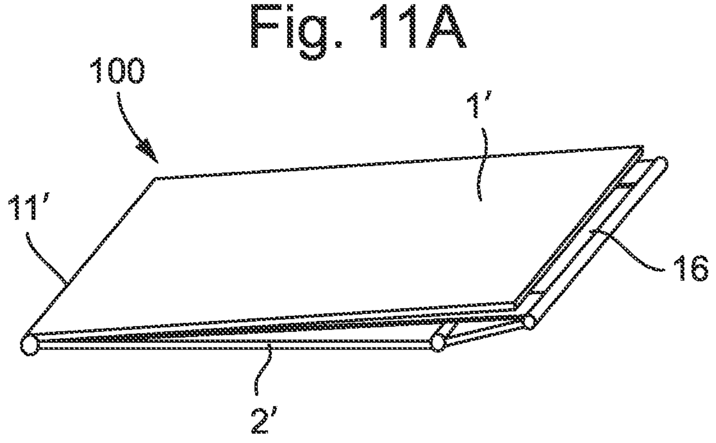
FIGS. 11A-C are schematic drawings the device of the present invention displaying a variation on the mechanism by which the opening of the device causes the functional membranes to bend.
Figure 11B:
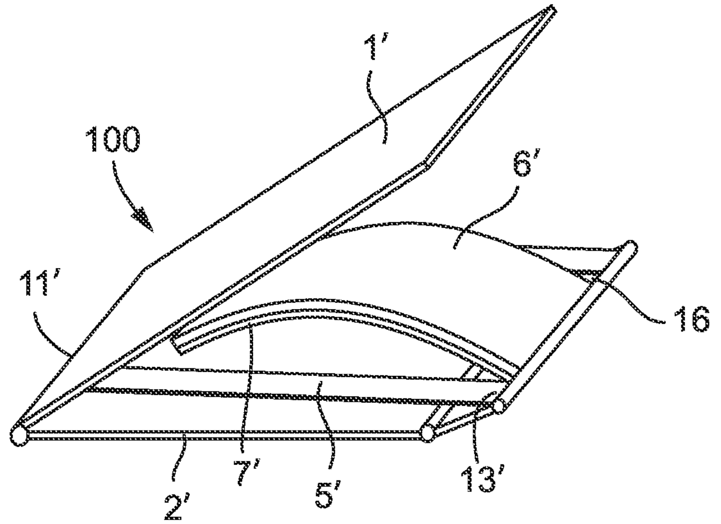
Figure 11C:
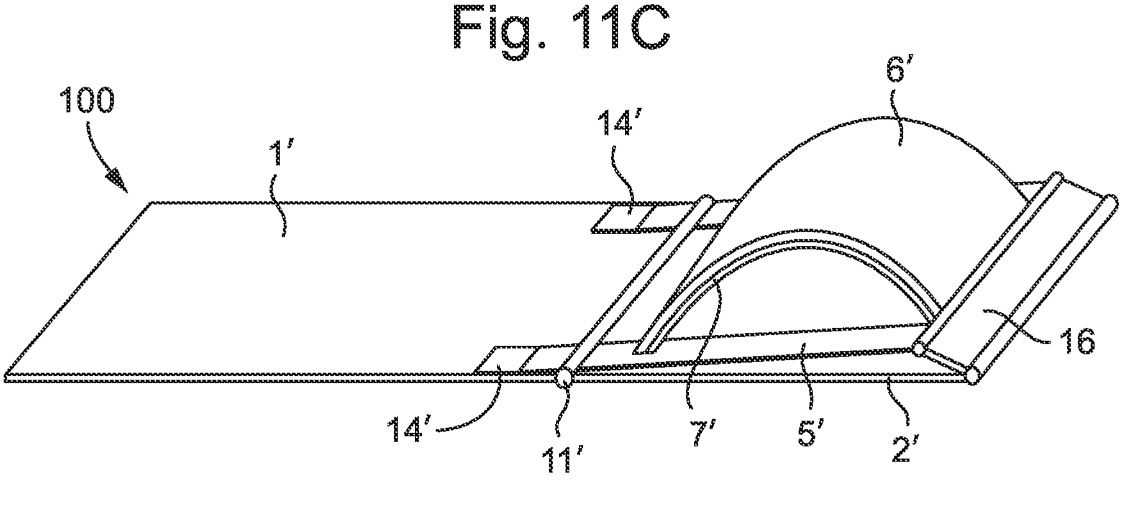

FIG. 11 is a schematic drawing providing a view of a variation in the design of the device 100. Elements having reference numerals with a prime symbol (') correspond to those used hereinabove without the prime symbol indicate like components, i.e. substantially corresponding in form and function. The difference in the design of device 100 shown in FIGS. 11A-C is in the back cover 2', which possess an additional fold or flap 16. This additional flap 16 is found at the opposite end of the back cover 2' to that of the hinge portion 11' and is attached to the free ends 8' of the separation and absorption membranes 6', 7'.

The transition of the device 100 from the closed position to the open position can be understood by reference to FIGS. 11A-C, where: FIG. 11A shows the closed position; FIG. 11 B shows the partially open position; and FIG. 11C shows the open position. In this particular set of embodiments, the free ends 13' of the straining portion 5', which are attached to the additional flap, slide along the back cover 2' towards the hinge portion 11' and in doing so pull on the flap of the back cover 2'. This motion pulls on the flap of the back cover 2' such that it folds over, as depicted in FIG. 11C. The folding over of the additional flap 16 of the back cover 2' serves as an alternative means by which the straining portion 5' pulls on the separation and absorption membranes 6', 7' to induce the bending of these membranes and thereby cause the compressive force thereon as outlined previously.

Figure 12:
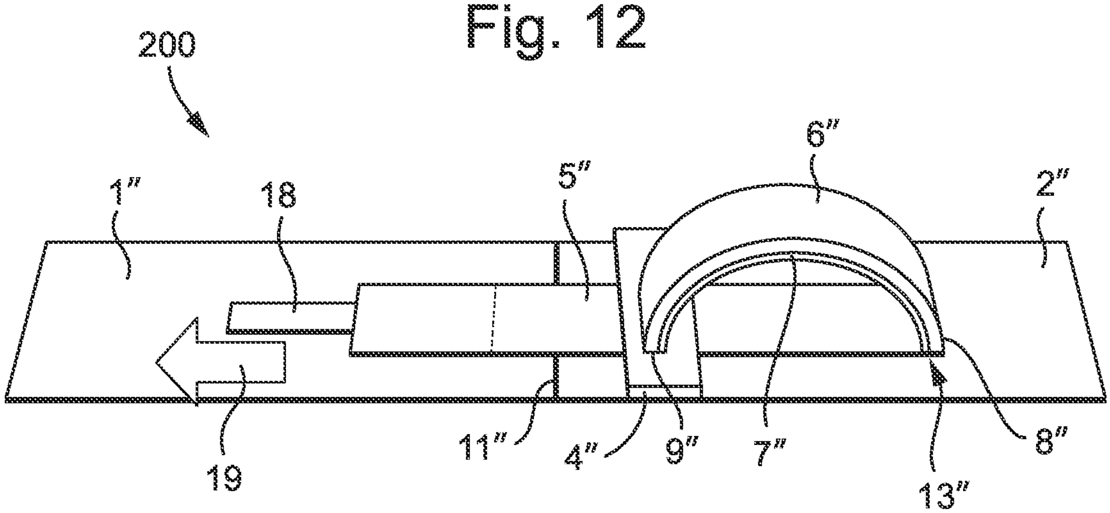
FIG. 12 is a schematic drawing illustrating an embodiment of the present invention including a pull cord.

FIG. 12 is a schematic drawing illustrating a further embodiment of the present invention in which the device 200 comprises a manually-operable actuation member. Elements having reference numerals with a double prime symbol (") correspond to those used hereinabove without the prime symbol indicate like components, i.e. substantially corresponding in form and function.

In particular, the manually-operable actuation member of the device 200 comprises a pull cord 18. Pulling of the pull cord 18 in the direction shown by arrow 19 causes said separation and absorption membranes 6,7 to bend thereby applying the further compressive force to said membranes.

In this particular embodiment, the straining portion 10" This pull cord 18 arrangement can be combined with any of the approaches outlined above in which the membranes are anchored to a cover of the device can be combined, such that opening the device applies a first compressive force on the membranes, and pulling the pull cord applies an additional compressive force on the membranes.

The device in accordance with embodiments of the present invention may readily provide suitable separation and collection of a biological sample obtained by, for example, finger pricks. The cellular fraction and liquid fraction can be readily split into aliquots to be processed in a clinical chemistry laboratory, subject to approval by donors. This would enable diagnostic tests to be carried out on samples, for medical and wellness purposes, and would permit the collection, transportation, build-up and long-term storage of vast biobanks at little cost, enabling easy follow-up by reference to earlier samples. Similar biological sample collections will also be of value in, for example, veterinary medicine.

The device of the present invention will be of interest for, e.g., prospective sample collection, as well as for disease-, therapy- or wellness-related collections. The device as described herein permits samples to be affordably collected from very large numbers of donors with potentially many samples being harvested from each individual. As described above, there is an increased interest by individuals in supplying biological samples, for example blood, and having these tested for wellness purposes. There is an increasing demand for individuals to have their biological samples analysed with respect to, for example, overall health checks and nutritional status, (auto)immunity states, signs of infection, etc. The device of the present invention offers a user-friendly means by which a wellness-conscious individual can simply prick their finger and send a sample via regular mail for analysis. Such a device also offers patients undergoing treatment the opportunity to take regular follow-up samples in their own homes and send these for analysis. Furthermore, sample donors taking part in e.g. research projects or clinical trials can be monitored by biological samples being taken by the individuals in their homes. It can also be readily appreciated that both prospective and disease-specific biobanks could be collected and maintained a low cost using the device described herein. The device of the present invention with the collected material may also be readily stored in large quantities, whether storage is, for example, at room temperature or in freezers.

The device of the present invention may also serve to allow detection and analysis of genetic material, e.g. DNA or RNA, in both the cellular and liquid fractions of the biological sample. It is well-known in the art per se that genetic material can be analysed in dried biological samples. In the case of blood samples, even after perfect separation of the liquid and cellular components, there will be DNA or RNA that is found in the cellular fraction and cell-free DNA or RNA present in the liquid fraction. By separating and collecting dried cellular and liquid fractions, the device of the present invention provides an effective means of analysing both cell-based DNA and cell-free DNA, as well as cell-based RNA and cell-free RNA The availability of collection devices, such as the device described herein, that serve to preserve the cellular component and liquid component of a biological sample may motivate the application of current and development of new molecular analysis assays of biological samples. Examples of suitable molecular analyses of the collected biological sample, for example blood, will be well-known to those skilled in the art. For example, the numbers of cells from different hemopoietic lineages, including subsets such as the different forms of T cells, which may be estimated by measuring levels of characteristic transcripts or proteins collected from the blood sample. It will be readily appreciated by those skilled in the art that several suitable techniques for protein measurements are available, such as proximity ligation assays or multiplex proximity extension assays, enzyme-linked immunosorbent assay (ELISA) (e.g. direct, sandwich, competitive or reverse ELISAs), or mass spectrometry, etc. In the case of nucleic acid analysis, different forms of polymerase chain reaction (PCR) or related amplification methods such as real-time PCR, reverse transcriptase PCR, digital PCR or loop-mediated isothermal amplification (LAMP) or nucleic acid sequence-based amplification (NASBA) assays, etc. could be utilised, as could e.g. padlock probe ligation assays. It may also be of interest to develop assays for metabolites or other analytes by, e.g., mass spectrometry.

Thus it will be appreciated that embodiments of the present invention provide a device that enhances the separation of cellular and liquid components of a biological sample in a small, light-weight, cheap, and easily-disposable package that is highly suitable for both storage and transportation. As outlined above, this device may have a 'book-like' structure of the present device, which may make it easy to stack multiple such devices in a way analogous to books on a bookshelf.

While specific embodiments of the invention have been described in detail, it will be appreciated by those skilled in the art that the embodiments described in detail are not limiting on the scope of the invention.

The invention claimed is:

1. A device for use in the separation of biological samples into a solid component and a liquid component, the device comprising:

(i) a front cover and a back cover connected at a hinge portion such that said device is operable between an open position and a closed position;

(ii) a separation membrane comprising a paper having filtration properties, the separation membrane being configured to capture the solid component and to allow the liquid component to pass therethrough;

(iii) an absorption membrane comprising a paper having absorption properties, the absorption membrane being configured to capture the liquid component that has passed through the separation membrane; and;

(iv) a straining portion having a fixed end fixed to the front cover or the back cover and a further end fixed to free ends of the separation membrane and/or the absorption membrane;

wherein said separation and absorption membranes are arranged in a layered structure between the front and back covers, with a face of the separation membrane overlying a face of the absorption membrane, said faces being in contact with one another when the device is in the open position; and wherein opening the device from the closed position to the open position causes the straining portion to draw said free ends towards the hinge portion such that said separation and absorption membranes bend and are thereby compressed against one another across said overlying faces, whereby the liquid component applied to the separation membrane is drawn into the absorption membrane by capillary action while the solid component is captured on the separation membrane.

2. The device as claimed in claim 1, wherein the separation membrane comprises a first fixed end and a first free end, and the absorption membrane comprises a second fixed end and a second free end, wherein the first and second fixed ends are both fixed to the front cover or the back cover at, or close to, the hinge portion of the device, and the first and second free ends are fixed together and are free to move laterally with respect to the first and second fixed ends as the device moves between the open and closed positions.

3. The device as claimed in claim 2, wherein the separation membrane and absorption membrane are fixed by an elongate anchor that extends substantially across the width of the device.

4. The device as claimed in claim 1, wherein the device further comprises a straining portion.

5. The device as claimed in claim 4, wherein the opening of the device causes the straining portion to apply the compressive force to said separation and absorption membranes.

6. The device as claimed in claim 1, wherein the separation membrane is arranged above the absorption membrane.

7. The device as claimed in claim 1, wherein the separation membrane and absorption membrane can be separately retrieved by punching out said membranes.

8. The device as claimed in claim 1, wherein the front cover and/or the back cover are made from a 'hole-punchable' material.

9. The device as claimed in claim 1, wherein the biological sample is at least one of: blood, cerebrospinal fluid, urine, saliva, tear fluid, lymphatic fluid, tissue fluid, bronchialveolar lavage (BAL), and ascites.

10. The device as claimed in claim 1, wherein the separation of biological samples into a solid component and a liquid component occurs by capillary action.

11. The device as claimed in claim 1, wherein the separation membrane comprises a filter paper that filters the liquid component of the biological sample, while capturing the solid components.

12. The device as claimed in claim 1, wherein the separation membrane layer comprises a single separation membrane or a plurality of separation membranes.

13. The device as claimed in claim 1, wherein the absorption membrane comprises an absorptive paper that captures the liquid component of the biological sample.

14. The device as claimed in claim 1, wherein the separation membrane or plurality of separation membranes are impregnated with active agents.

15. The device as claimed in claim 1, wherein the solid component comprises a cellular component.

16. A method of separating biological samples into a solid component and liquid component using the device of claim 1, the method comprising:

(i) opening the device;

(ii) providing a sample from a subject;

(iii) applying said sample to the layered structure;

(iv) allowing the biological sample to substantially dry; and (v) closing the device.

17. The method as claimed in claim 16, wherein the sample is provided by a non-invasive means.

18. The method as claimed in claim 16, wherein after step (iv) a separating leaflet is provided to interleave the separation membrane and absorption membrane.

19. The method as claimed in claim 16, wherein the solid component and liquid components are removed after step (v) by punching the sample out of the device.

20. The method as claimed in claim 16, wherein after the step (v) the device can be readily stored and stacked for transportation.

21. A device for use in the separation of biological samples into a solid component and a liquid component, the device comprising:

(i) a front cover and a back cover connected at a hinge portion such that said device is operable between an open position and a closed position;

(ii) a separation membrane comprising a paper having filtration properties, the separation membrane being configured to capture the solid component and to allow the liquid component to pass therethrough;

(iii) an absorption membrane comprising a paper having absorptive properties, the absorption membrane being configured to capture the liquid component that has passed through the separation membrane the liquid component; and (iv) a manually-operable actuation member;

wherein said separation and absorption membranes are arranged in a layered structure between the front and back covers, with a face of the separation membrane overlying a face of the absorption membrane; and wherein the manually-operable actuation member is arranged such that, when operated, the actuation member causes said separation and absorption membranes to bend and thereby be compressed against one another across said overlying faces, whereby the liquid component applied to the separation membrane is drawn into the absorption membrane by capillary action while the solid component is captured on the separation membrane.

22. The device as claimed in claim 21, wherein the manually-operable actuation member comprises a pull cord, wherein pulling of the pull cord causes said separation and absorption membranes to bend thereby applying the compressive force to said membranes.

23. The device as claimed in claim 1, wherein the separation membrane comprises a Vivid Plasma Separation Membrane filter paper of grade GF, GX or GR.

24. The device as claimed in claim 21, wherein the separation membrane comprises a Vivid Plasma Separation Membrane filter paper of grade GF, GX or GR.

* * * * *